US008590043B2

(12) United States Patent
Huddleston (10) Patent No.: US 8,590,043 B2
(45) Date of Patent: Nov. 19, 2013

(54) METHOD AND SYSTEMS FOR COMPUTER SECURITY

(75) Inventor: David E. Huddleston, Lakewood, OH (US)

(73) Assignee: CA, Inc., Islandia, NY (US)

( * ) Notice: Subject to any disclaimer, the term of this patent is extended or adjusted under 35 U.S.C. 154(b) by 172 days.

(21) Appl. No.: 13/214,548

(22) Filed: Aug. 22, 2011

(65) Prior Publication Data

US 2012/0023585 A1 Jan. 26, 2012

Related U.S. Application Data

(62) Division of application No. 11/130,919, filed on May 17, 2005, now Pat. No. 8,006,301.

(60) Provisional application No. 60/572,531, filed on May 19, 2004, provisional application No. 60/572,515, filed on May 19, 2004.

(51) Int. Cl.
*G06F 21/00* (2013.01)

(52) U.S. Cl.
USPC .......................................................... 726/23

(58) Field of Classification Search
USPC ............ 380/200, 30; 713/150, 182, 187, 188; 726/4, 13, 30, 24; 719/311; 709/12, 14; 714/57
See application file for complete search history.

(56) References Cited

U.S. PATENT DOCUMENTS

| | | | |
|---|---|---|---|
| 5,842,002 A | 11/1998 | Schnurer et al. ............... 395/500 |
| 6,192,512 B1 | 2/2001 | Chess ................................ 717/5 |
| 6,701,440 B1 * | 3/2004 | Kim et al. ......................... 726/24 |
| 6,757,830 B1 | 6/2004 | Tarbotton et al. ............. 713/188 |
| 2001/0042214 A1 * | 11/2001 | Radatti et al. ................. 713/201 |
| 2002/0056076 A1 | 5/2002 | Made ............................... 717/129 |
| 2002/0194490 A1 | 12/2002 | Halperin et al. ............... 713/200 |
| 2003/0074574 A1 | 4/2003 | Hursey et al. .................. 713/200 |
| 2003/0084323 A1 | 5/2003 | Gales ............................. 713/200 |
| 2003/0088680 A1 | 5/2003 | Nachenberg et al. ......... 709/229 |
| 2003/0120952 A1 | 6/2003 | Tarbotton et al. ............. 713/201 |
| 2003/0135791 A1 | 7/2003 | Natvig ............................. 714/38 |
| 2003/0149726 A1 | 8/2003 | Spear ............................ 709/206 |
| 2004/0030913 A1 | 2/2004 | Liang et al. ................... 713/200 |
| 2004/0205419 A1 | 10/2004 | Liang et al. ..................... 714/57 |
| 2005/0060535 A1 * | 3/2005 | Bartas ............................ 713/154 |
| 2005/0097199 A1 | 5/2005 | Woodard et al. .............. 709/223 |

FOREIGN PATENT DOCUMENTS

| | | |
|---|---|---|
| EP | 1 316 873 A2 | 6/2003 |
| WO | WO 00/34867 | 6/2000 |
| WO | WO 03/063431 A2 | 7/2003 |

OTHER PUBLICATIONS

Notification of Transmittal of the International Search Report for application PCT/US2005/016996 (9 pages), Nov. 30, 2005.
Written Opinion of the International Searching Authority for application PCT/US2005/016996 (7 pages), Nov. 30, 2005.

(Continued)

*Primary Examiner* — Brandon Hoffman
*Assistant Examiner* — Nega Woldemariam
(74) *Attorney, Agent, or Firm* — Baker Botts, L.L.P.

(57) ABSTRACT

A method for computer security, includes intercepting an incoming communication, placing the communication into a quarantine queue, selecting a communication from the quarantine queue, determining whether the selected communication contains undesirable code, determining whether a quarantine time for the selected communication has lapsed if the selected communication does not contain undesirable code and placing the selected communication back in the quarantine queue if the quarantine time has not elapsed.

45 Claims, 7 Drawing Sheets

(56) References Cited

OTHER PUBLICATIONS

International Searching Authority, Invitation to Pay Additional Fees for application PCT/US2005/016996 (5 pages), Oct. 6, 2005.
Notification of Transmittal of the International Search Report for application PCT/US2005/016994 (7 pages), Sep. 21, 2005.
Written Opinion of the International Searching Authority for application PCT/US2005/016994 (5 pages), Sep. 21, 2005.
XP-002241249 NORMAN; Norman Virus Control for Workstations; Version 5.00; Reference Guide; (8 pages), 2001.
EPO Communication Pursuant to Article 94(3) EPC; Application No. 05 762 177.3-1245; Ref: HCD/J00049168EP, Apr. 2, 2009.

* cited by examiner

METHOD AND SYSTEMS FOR COMPUTER SECURITY

REFERENCE TO RELATED APPLICATION

This application is a divisional of U.S. application Ser. No. 11/130,919, filed May 17, 2005 and entitled "Method and Systems for Computer Security" which is based on and claims the benefit of Provisional application Ser. No. 60/572,531 filed May 19, 2004 and Provisional application Ser. No. 60/572,515 filed May 19, 2004, the entire contents of which are herein incorporated by reference.

BACKGROUND

1. Technical Field

The present disclosure, relates generally to computer security and, more particularly, to methods and systems for computer security.

2. Description of the Related Art

With the growth of the Internet, the increased use of computers, and the exchange of information between individual users poses a threat to the security of computers. Computer security attempts to ensure the reliable operation of networking and computing resources and attempts to protect information on the computer or network from unauthorized corruption, access or disclosure. Computer system(s) as referred to herein may include(s) individual computers, servers, computing resources, networks, etc. Among the various security threats that present increasingly difficult challenges to the secure operation of computer systems are computer viruses, worms, Trojan horses, etc. Computer viruses are programs that can infect other programs by modifying them in such a way as to include a copy of themselves. Unlike computer viruses, worms do not need to infect other programs. Worms are independent programs that are capable of reproducing themselves, spreading from machine to machine across network connections, often via email.

Among the activities that can rapidly infect an unprotected computer system are sending and receiving email, sharing files, using online resources and conducting real-time transactions. Most recent virus outbreaks seem to be primarily propagated by email.

Users may utilize anti-virus programs in order to protect their computer systems and their email from security threats. Anti-virus programs, such as antivirus scanning programs; operate to protect computer systems against the spread of viruses by detecting the virus and isolating or removing the viral code. For example, an antivirus scanning program may contain a list of previously defined virus signatures, containing the binary patterns of a virus, each associated with a virus and can scan the various files of a system looking for a match to a particular virus signature. If a virus is detected, the user may be notified and further steps may be taken to rid the system of the malicious code.

Figure 1:
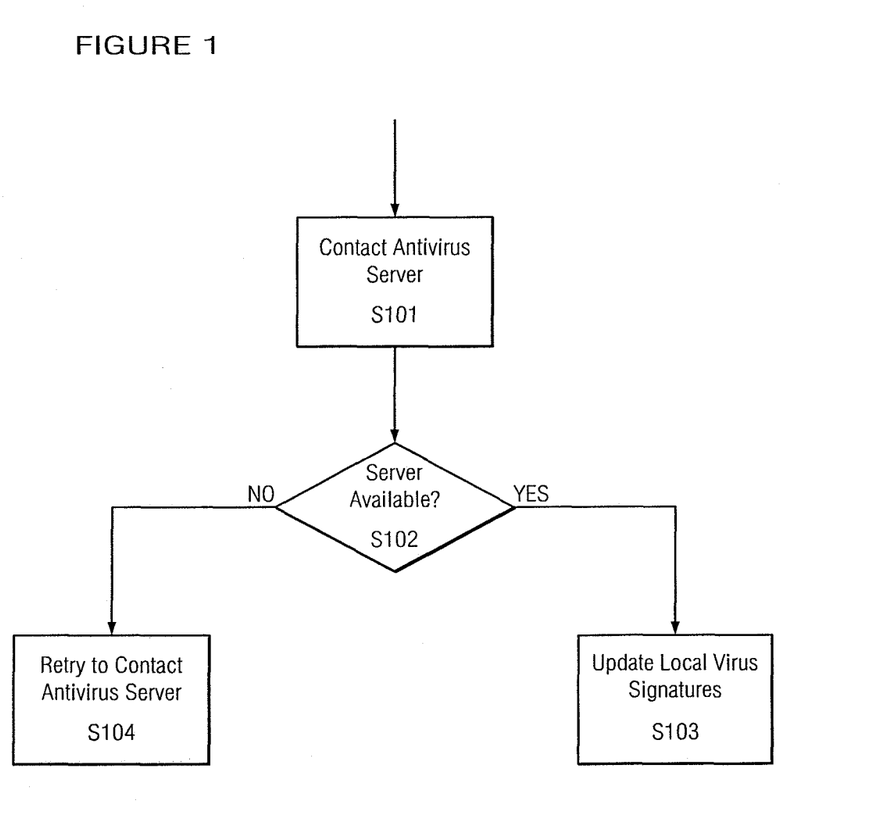
FIG. 1 shows a flow chart illustrating a background art subscription service.

Most anti-virus vendors offer a subscription service that provides users with virus signature updates as new virus outbreaks occur. These signatures can be automatically deployed to the subscriber or can be individually requested by the subscriber. Antivirus scanning agent software located on the computer system can then use the signatures to scan email for known viruses. FIG. 1 is a flow chart illustrating the standard subscription service. An antivirus agent contacts the antivirus server (Step S101). If the server is available (Step S102), then the antivirus agent updates the local virus signatures (Step S103). If the server is not available (Step S102), then the antivirus agent attempts to contact the server again (Step S101).

Figure 2:
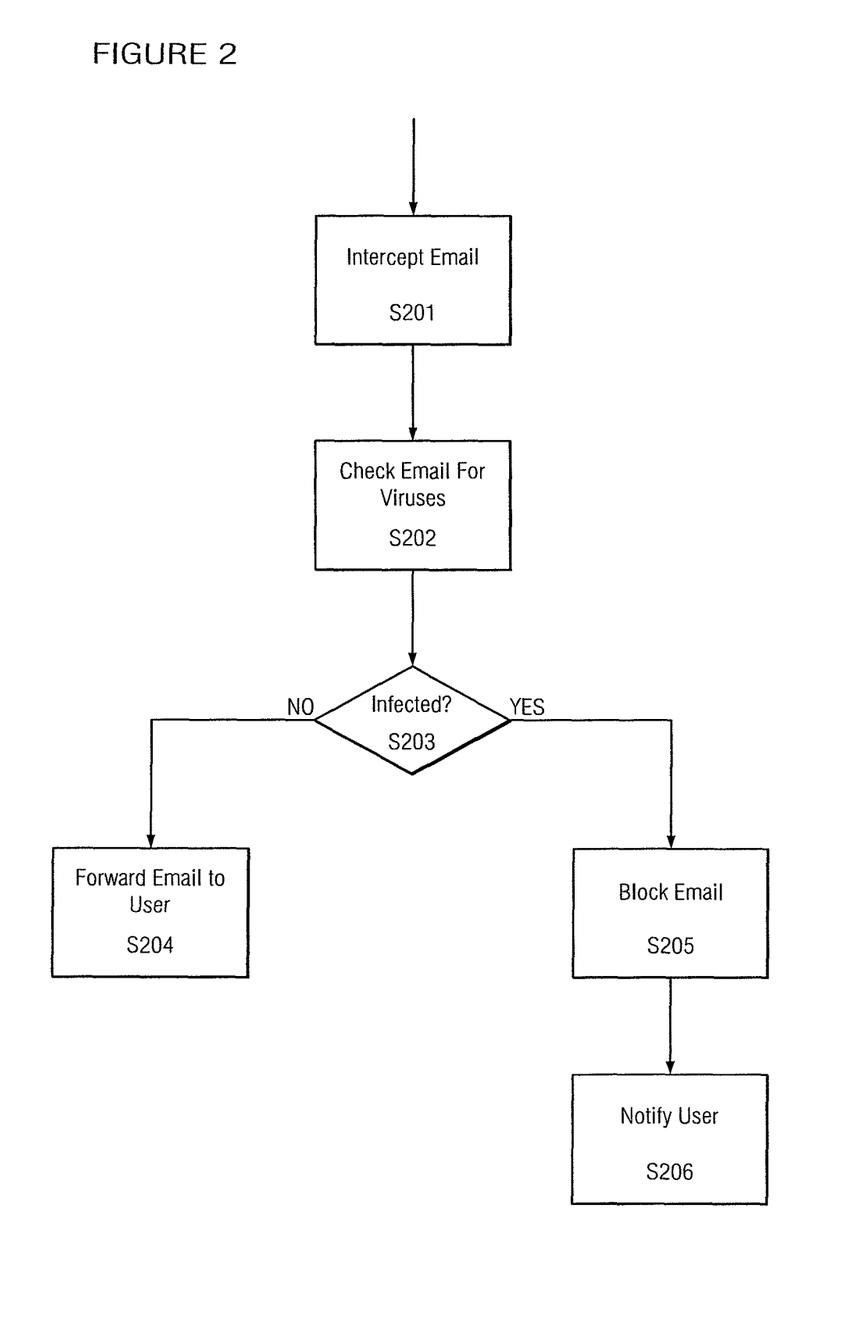
FIG. 2 shows a flow chart illustrating a background art email antivirus strategy.

FIG. 2 is a flow chart illustrating an email antivirus strategy. An antivirus agent intercepts an email (Step S201) and checks the email (e.g., the email body and/or attachment) against the virus signatures (Step S202). If it is determined that the email is not infected (No, Step S203), then the antivirus agent delivers the email to the user's inbox (Step S204). However, if it is determined that the email is infected (Yes, Step S203), then the antivirus agent blocks the email and/or attachment (Step S205) and notifies the user of the infection (Step S206).

Anti-virus programs, such as virus scanning agent software described above may detect viruses present in the system, but may do nothing to prevent them from infiltrating the system in the first place. The virus scanning agent software should be continuously updated in order to be effective in detecting new and modified viruses. This not only proves to be a very tedious and time consuming task for computer users, but also may not happen often enough to provide adequate safeguards against foreign intrusions. Furthermore, many machines can become infected before a new virus signature is even available.

Accordingly, it would be beneficial to provide a reliable and effective way to prevent virus outbreaks propagated through email altogether before a virus signature is made available to detect the virus.

SUMMARY

A method, system and computer recording medium for computer security are disclosed, the method for computer security comprising intercepting an incoming communication, placing the communication into a quarantine queue, selecting a communication from the quarantine queue, determining whether the selected communication contains undesirable code, determining whether a quarantine time for the selected communication has lapsed if the selected communication does not contain undesirable code and placing the selected communication back in the quarantine queue if the quarantine time has not elapsed.

A method, system and computer recording medium for computer security are disclosed, the method for computer security comprising monitoring local computer system conditions, adjusting a local alert level based on the local computer system conditions, connecting to an antivirus server, transmitting the adjusted local alert level to the antivirus server, reconciling the adjusted local alert level with a global alert level and downloading signatures from the antivirus server.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for computer security. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 3:
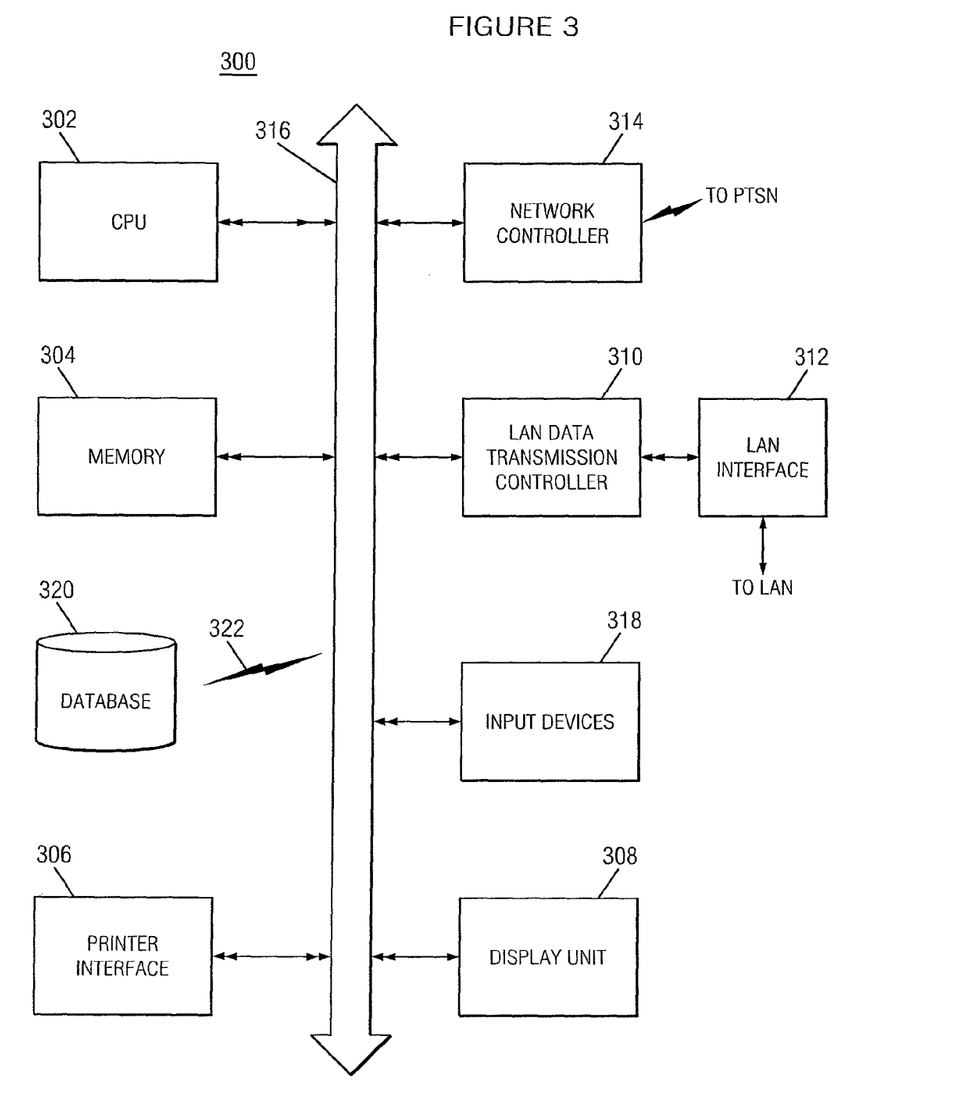
FIG. 3 shows a block diagram of an exemplary computer system capable of implementing the method and system of the present disclosure.

FIG. 3 shows an example of a computer system 300 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 300 can include a central processing unit (CPU) 302, program and data storage devices 304, a printer interface 306, a display unit 308, a (LAN) local, area network data transmission controller 310, a LAN interface 312, a network controller 314, an internal bus 316, and one or more input devices 318 (for example, a keyboard, mouse etc.). As shown, the system 300 may be connected to a database 320, via a link 322.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Email can be quarantined for a certain amount of time in order to rapidly isolate and prevent new virus outbreaks. The method and system of the present disclosure provides users with the opportunity to conduct multiple virus signature checks, allowing a signature for an emerging virus to be developed before the total quarantine time for an email elapses, thereby preventing the spread of malicious viruses.

For example, an email may be quarantined for a length of time that may allow for a new virus definition to be developed and implemented. Prior to the expiration of the quarantine time, new virus definitions may be acquired and installed and the email may be rechecked for viruses in light of the new virus definitions. It may therefore be possible to identify and remediate the infected email even though the email was received prior to the development of an appropriate virus signature.

Moreover, embodiments of the present disclosure may be used for mitigating the effects of SPAM. SPAM may be undesirable code in the form of undesired and/or unsolicited commercial emails designed to advertise products and services and/or entice an unwitting user into a confidence trick. The high-volume in which SPAM may be received can harm user productivity. Antispam tools have been developed to combat SPAM however; these tools often suffer from the same disadvantages associated with antivirus programs. For example, antispam tools may rely on SPAM signatures to identify which emails are SPAM. Because these signatures may be updated after the email is received, embodiments of the present disclosure may be used to quarantine emails to allow for the implementation of appropriate SPAM signatures.

Embodiments of the present disclosure are not limited to protecting email systems from undesirable code such as, for example, viruses and SPAM, embodiments of the present disclosure may be used to protect other communications systems, for example, instant messaging systems, mobile phone text messaging systems and/or facsimile machines.

For simplicity, embodiments of the present disclosure may be described in terms of antivirus programs and email systems, however it is to be understood that these embodiments may also be applied to other forms of undesirable code, for example worms and Trojan horses and/or SPAM, in any communications system, for example, instant messaging systems, mobile phone text messaging systems and/or facsimile machines.

In the present disclosure, a server that checks for undesirable code may be referred to as an antivirus server even when such a server is used to check for undesirable code such as Trojan horses, worms and SPAM.

Figure 4:
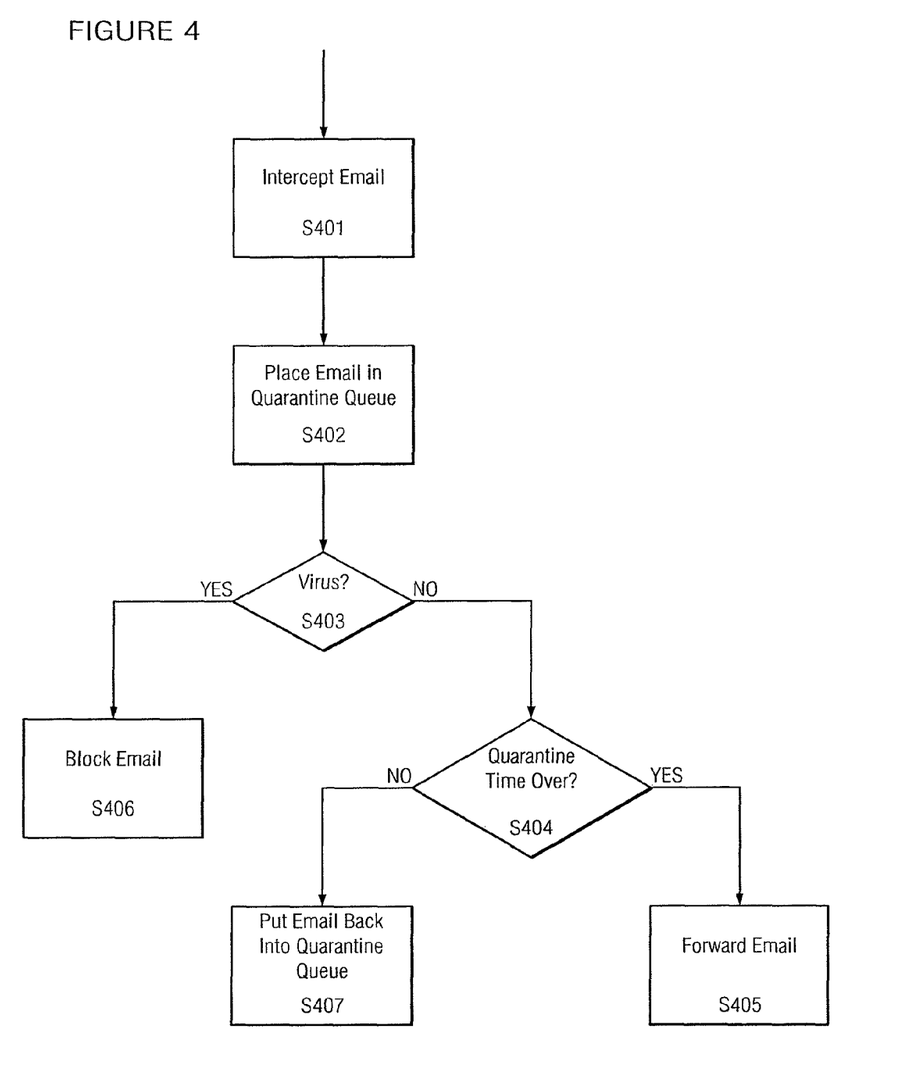
FIG. 4 shows a flow chart illustrating a method for computer security, according to an embodiment of the present disclosure.

FIG. 4 is a flow chart illustrating a method for computer security, according to an embodiment of the present disclosure. Incoming email is intercepted (Step S401) and placed into a quarantine queue (Step S402). The amount of time that an email will spend in the queue may vary depending on a number of factors as will be described later below. The term email as used herein may include the email body and/or any attachments to the email. The time that the incoming email was placed in the queue may be determined and stored. An email is then selected from the quarantine queue and compared to a list of virus signatures to determine if the selected email contains a virus (Step S403). If it is determined that the selected email contains a virus (Yes, Step S403), then the selected email or attachment can be blocked and a user can be notified that the selected email is infected (Step S406). If it is determined that the selected email does not contain a virus, a total amount of time that the email has been quarantined is then determined for the selected email (Step S404). If the total quarantine time for the email has not elapsed (No, Step S404), the selected email is placed back into the quarantine queue (Step S407). The total quarantine time can be based on a local alert level. For example, if the local alert level is high, email can be quarantined for a longer period of time than if the alert level was low. The user may be presented with a graphical user interface (GUI) allowing the local alert level to be set as desired. The total quarantine time may also be based on the selected email's comparison to one or more user lists, where the user lists contain sender email addresses each associated with a quarantine time. For example, users can establish different quarantine times depending on the perceived trustworthiness of the sender, placing different levels of trustworthiness on different lists of senders. For example, through a user list, a policy can be established that unconditionally quarantines emails from senders outside of a company's Intranet for a minimum amount of time. If the total quarantine time of the email has lapsed (Yes, Step S404), the email is released from quarantine. For example, the email may be forwarded to the recipient or forwarded on to an email server for later delivery (Step S405).

Figure 5:
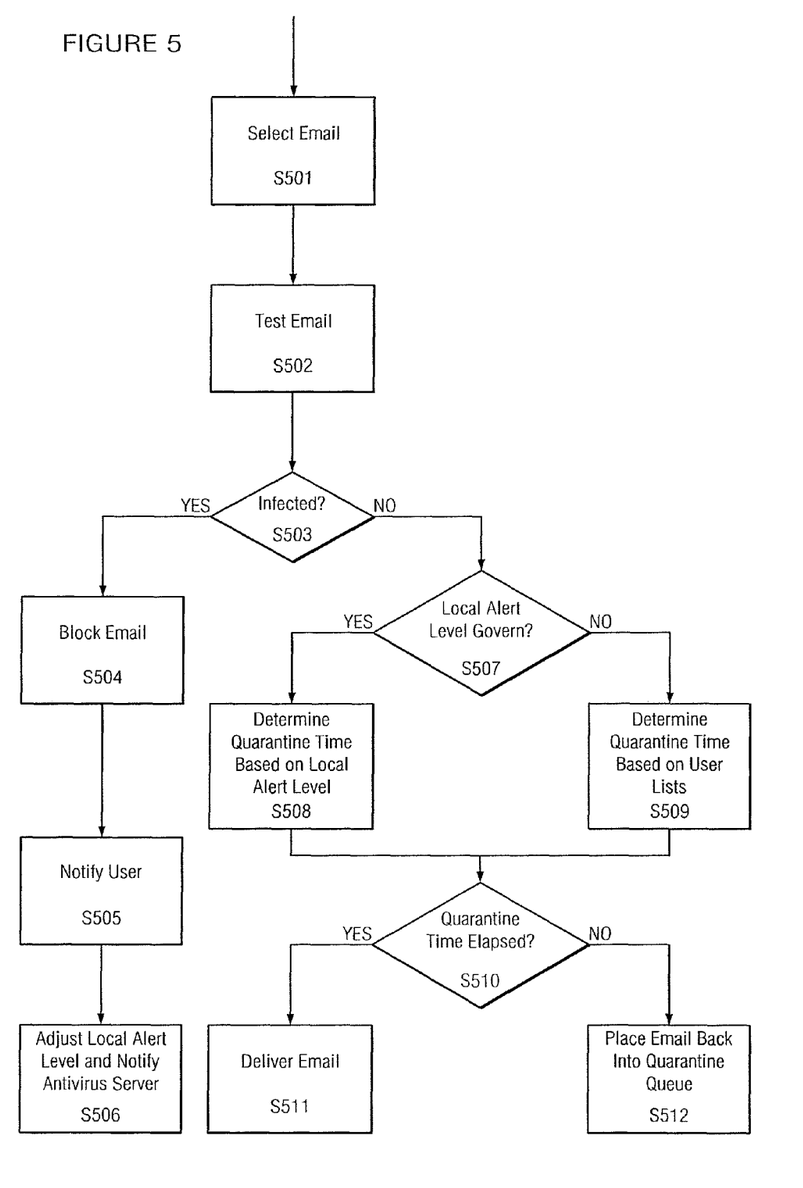
FIG. 5 shows a flow chart illustrating the automatic timed quarantine of email, according to an embodiment of the present disclosure.

A more detailed flow chart illustrating the automatic timed quarantine of email, according to an embodiment of the present disclosure, will be described with reference to FIG. 5. An email is selected from a quarantine queue (Step S501) and compared to a list of virus signatures to determine if it contains a virus (Step S502). If it is determined that the email contains a virus (Yes, Step S503), the email (and/or attachment) containing the virus can be blocked (Step S504), and a user can be notified (Step S505). In addition, the local alert level can be adjusted and the antivirus server can also be notified of the virus (Step S506). For example, if a lot of infected emails have been detected and blocked, the alert level may be adjusted upward to a higher level, either automatically or by the user. On the other hand, if it is determined that the email does not contain a virus (No, Step S503), it is determined whether or not a local alert level governs the email (Step S507). If it is determined that a local alert level governs the email (Yes, Step S510), then the total quarantine time is determined based on the local alert level (Step S508). However, if it is determined that a local alert level does not govern the email (No, Step S507), then the total quarantine time is determined based on the user lists (Step S509). In any event, if the total quarantine time has not elapsed (No, Step S510), then the email is placed back into the quarantine queue (Step S512) and the process restarts. However, if the quarantine time has elapsed (Yes, Step S510), the email is forwarded (Step S511) and the process restarts.

Figure 6:
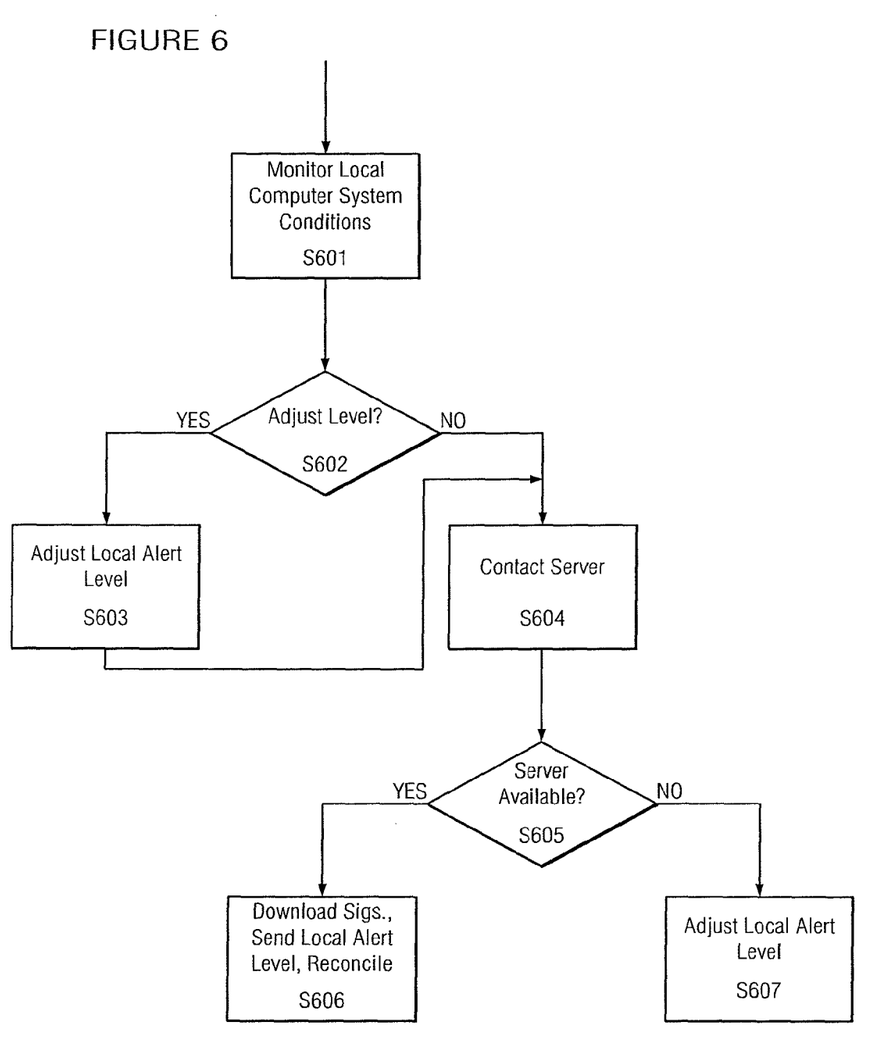
FIG. 6 shows a flow chart illustrating the downloading of new virus signatures in connection with adjusting a quarantine period based on a local alert level, according to an embodiment of the present disclosure.

According to an embodiment of the present disclosure, the quarantine time period can be automatically adjusted based on a detectable and/or published alert level. FIG. 6 is a flow chart illustrating the downloading of new virus signatures in connection with adjusting a quarantine period based on local system conditions, according to an embodiment of the present disclosure. Local computer system conditions can be monitored (Step S601) and a determination can be made whether the local alert level should be adjusted (Step S602) based on the local computer system conditions. Conditions that may warrant the escalation of the local alert level might be detectable through drastically increased network packets, unusual email server traffic, etc. A variety of rule-based or machine learning methods can be used to identify "unusual" system conditions. If it is determined that the local alert level should be adjusted (Yes, Step S602), the local alert level can be adjusted accordingly (Step S603) and then the antivirus server can be contacted and, for example, updated virus signatures downloaded (Step S604). In addition, alert levels can automatically be adjusted on certain dates, such as well-known "hacker holidays", which are dates hackers may select to unleash an attack or can be adjusted based on external inputs. If it is determined that the alert level is not to be adjusted (No, Step S602), the antivirus server can be contacted (Step S604). If the antivirus server is available (Yes, Step, S605), the virus signatures can be downloaded, and the local alert level can be transmitted and reconciled with a global alert level (Step S606) and process can be restarted. The local alert level can be reconciled in accordance with predefined rules. For example, higher global alert levels can supersede lower local alert levels, higher local alert levels can time out unless they are reinforced by a global alert level, etc.

However, if the antivirus server is not available (No, Step S605), then the local alert level can be adjusted, for example, escalated or lowered (Step S607) and the process can restart. The escalation of the local alert level can be progressive, for example, initial server unavailability can escalate the local alert level by one grade and subsequent unavailability can result in further escalations.

The alert level may be automatically adjusted, for example, based on statistics gathered locally and/or remotely. For example, if the number of viruses found in emails increases, alert levels may be escalated. The alert level may be automatically adjusted, for example, based on patterns and trends. For example, the alert level may be escalated if certain words appear in the subject line of the email. The alert level may be automatically adjusted, for example, based on outside alerts. For example, the alert level may be escalated based on a national security alert.

According to another embodiment of the present disclosure, the quarantine time period can be automatically adjusted based on one or more user lists. The user lists can correspond to email senders that a user may or may not trust. For example, depending on who is sending an incoming email, different levels of quarantine time can be provided. For example, a user can designate three lists, an "A List", a "B List" and a "C List" The "A List" corresponds to persons that the user trusts, the "B List" corresponds to persons that the users isn't sure about, and the "C List" corresponds to persons that the user definitely does not trust. Emails sent from persons on the "A List" can then be quarantined for little or no time, emails from persons sent from the "B List" can be quarantined for a longer time, and emails from persons sent from the "C List" can be quarantined for a long time.

Figure 7:
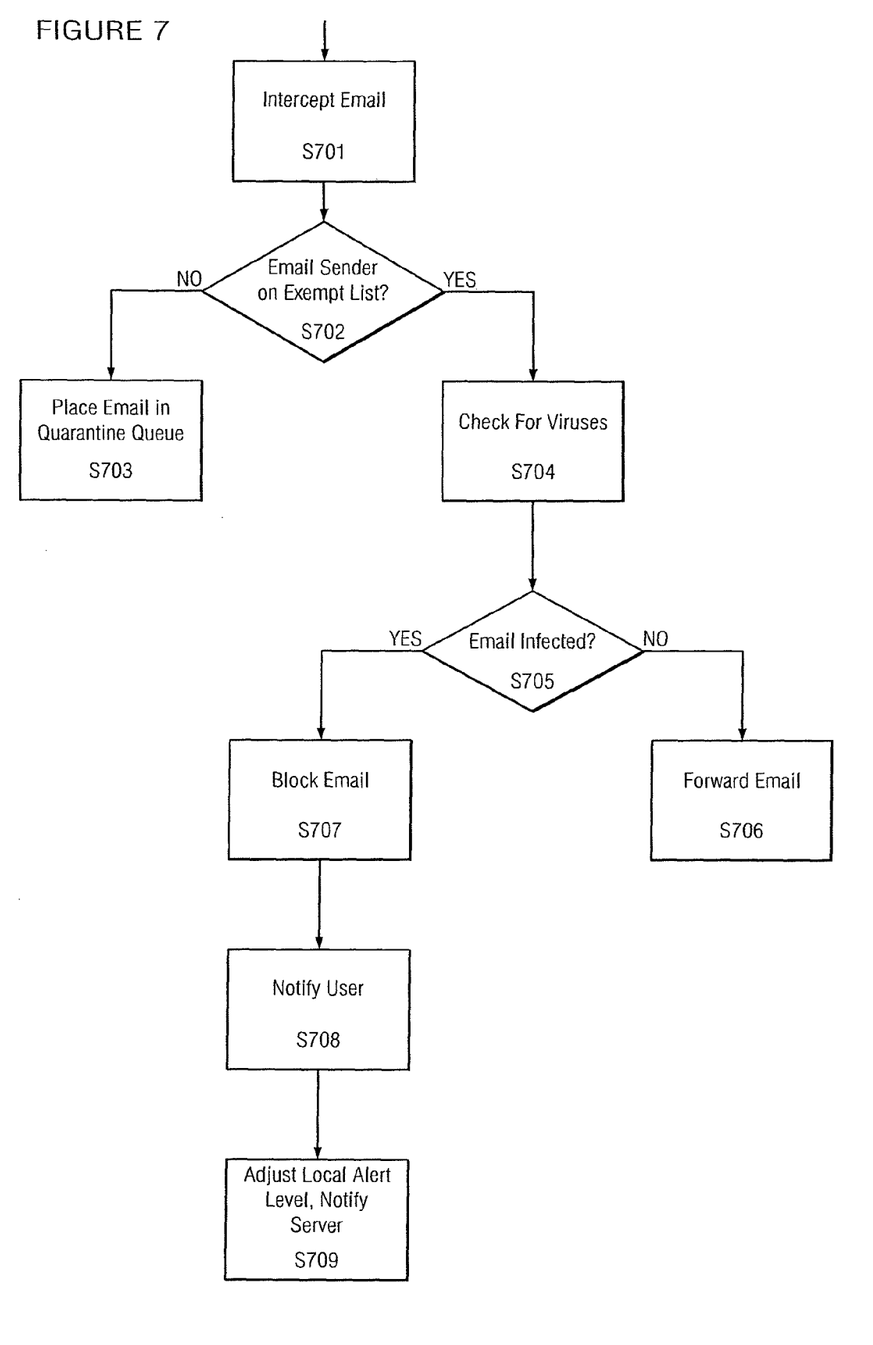
FIG. 7 is a flow chart illustrating the automatic quarantine of emails where a user decides to implement a list that exempts certain emails from the quarantine process, according to an embodiment of the present disclosure.

FIG. 7 is a flow chart illustrating the automatic quarantine of emails where a user decides to implement a list of persons from which emails are exempt from the quarantine process, according to an embodiment of the present disclosure. An email is intercepted (Step S701) and it is determined whether the sender of the email is on an exempt user list (Step S702). If it is determined that the email is not on the "Exempt" user list (No, Step S702), then the email is placed in the quarantine queue (Step S703) to undergo the automatic timed quarantine process described above. However, if it is determined that the email is on the "Exempt" user list (Yes, Step S702), then the email is exempted from the quarantine process and can be immediately checked for viruses by comparing the email to a list of virus signatures (Step S704). If the email and/or attachment is not infected (No, Step S705), it can be delivered to the recipient's mailbox (Step S706) and the process can restart. However, if the email is infected (Yes, Step S705), then the infected email and/or attachment can be blocked (Step S707) and a user (e.g., end recipient of the email) can be notified of the virus (Step S708). In addition, the local alert level can be adjusted and the antivirus server can also be notified of the virus (Step S709).

Lists may be user defined and/or automatically updated. For example, a sender may be downgraded to a lower list if an email sent by that user is found to contain a virus. For example, a sender on the B list may be downgraded to the C list if an email sent by the sender is found to have been infected. Similarly, sender's emails that are consistently free from viruses may be automatically upgraded to a higher list.

For example, a sender on the B list may be upgraded to the A list if emails send by that sender are consistently found to be free of viruses.

Additional embodiments of the present disclosure may be used to augment previously discussed embodiments by implementing a system to retrieve delivered emails back into the email quarantine queue. These could be either emails which had previously undergone quarantine, or emails which were considered trusted and delivered immediately. The rational for retrieving delivered emails would be as one of the possible responses to a heightened alert level. Alert levels could be heightened for multiple reasons including but not limited to an outside, alert or warning, discovery of a virus on the local network, or detection of suspicious patterns in network activity. Such retrieval would be particularly beneficial for emails not yet read by the user. However, benefits to users could still be obtained for emails which had been read, but whose infectious content has not been triggered yet. The possibility of overloading the quarantine queue due to retrieving the contents of an overly full Inbox could be mitigated, for example by limiting the retrievals to only those received within some recent time period. A further refinement of this Inbox handling would be to implement a system to disable or inhibit the operation of email client preview features, such as is available in Microsoft Outlook. Inhibiting email previewing could greatly lengthen the grace period during which an infected email could be retrieved back into quarantine before it could infect a user's system. In tandem with retrieving recent emails under heightened alert, the basic quarantine sub-system could dynamically alter the timed quarantine process, such as by lengthening quarantine times or by disabling immediate delivery of previously trusted emails.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for computer security, comprising:
    intercepting an incoming communication;
    placing the communication into a quarantine queue;
    selecting a communication from the quarantine queue;
    determining whether the selected communication contains undesirable code;
    in response to determining that the selected communication does not contain undesirable code, determining whether a quarantine time for the selected communication has lapsed; and
    in response to determining that the quarantine time has not elapsed, placing the selected communication back in the quarantine queue.

2. The method of claim 1, wherein the incoming communication is an incoming email and the selected communication is a selected email.

3. The method of claim 1, wherein the incoming communication is an incoming instant message and the selected communication is a selected instant message.

4. The method of claim 1, wherein the incoming communication is an incoming mobile phone text message and the selected communication is a selected mobile phone text message.

5. The method of claim 1, wherein the undesirable code is a computer virus.

6. The method of claim 1, wherein the undesirable code is a Trojan horse.

7. The method of claim 1, wherein the undesirable code is a worm.

8. The method of claim 1, wherein the undesirable code is SPAM.

9. The method of claim 1, wherein signatures for determining whether communications contain undesirable code are updated prior to determining whether the selected communication contains undesirable code.

10. The method of claim 1, wherein the incoming communication can contain an attachment, and determining whether the selected communication contains undesirable code comprises determining whether at least one of a body of the communication and the attachment contain undesirable code.

11. The method of claim 1, wherein determining whether the selected communication contains undesirable code comprises comparing the selected communication to a list of signatures, and wherein the selected communication contains undesirable code if it matches a signature in the list of signatures.

12. The method of claim 10, further comprising blocking the selected communication that contains undesirable code from reaching an intended recipient and notifying the intended recipient that the selected communication contains undesirable code.

13. The method of claim 1, further comprising adjusting a local alert level and notifying an antivirus server if the selected communication contains undesirable code.

14. The method of claim 1, wherein the quarantine time is determined by at least one of a local alert level and by comparing the selected communication to one or more user lists, the user lists comprising sender communication addresses each associated with a quarantine time.

15. The method of claim 1, wherein the selected communication is delivered to a user's mailbox if it is determined that the quarantine time has elapsed and the selected communication does not contain undesirable code.

16. A system for computer security, comprising:
    a system for intercepting an incoming communication;
    a system for placing the communication into a quarantine queue;
    a system for selecting a communication from the quarantine queue;
    a system for determining whether the selected communication contains undesirable code;
    a system for, in response to determining that the selected communication contains undesirable code, determining whether a quarantine time for the selected communication has lapsed; and
    a system for, in response to determining that the quarantine time has not elapsed, placing the selected communication back in the quarantine queue.

17. The system of claim 16, wherein the incoming communication is an incoming email and the selected communication is a selected email.

18. The system of claim 16, wherein the incoming communication is an incoming instant message and the selected communication is a selected instant message.

19. The system of claim 16, wherein the incoming communication is an incoming mobile phone text message and the selected communication is a selected mobile phone text message.

20. The system of claim 16, wherein the undesirable code is a computer virus.

21. The system of claim 16, wherein the undesirable code is a Trojan horse.

22. The system of claim 16, wherein the undesirable code is a worm.

23. The system of claim 16, wherein the undesirable code is SPAM.

24. The system of claim 16, wherein signatures for determining whether communications contain undesirable code are updated prior to determining whether the selected communication contains undesirable code.

25. The system of claim 16, wherein the incoming communication can contain an attachment, and determining whether the selected communication contains undesirable code comprises determining whether at least one of a body of the email and the attachment contain undesirable code.

26. The system of claim 16, wherein determining whether the selected communication contains undesirable code comprises comparing the selected communication to a list of signatures, and wherein the selected communication contains undesirable code if it matches a signature in the list of signatures.

27. The system of claim 25, further comprising a system for blocking the selected communication that contains undesirable code from reaching an intended recipient and notifying the intended recipient that the selected communication contains undesirable code.

28. The system of claim 16, further comprising a system for adjusting a local alert level and notifying an antivirus server if the selected communication contains a virus.

29. The system of claim 16, wherein the quarantine time is determined by at least one of a local alert level and by comparing the selected communication to one or more user lists, the user lists comprising sender addresses each associated with a quarantine time.

30. The system of claim 16, wherein the selected communication is delivered to a user's mailbox if it is determined that the quarantine time has elapsed and the selected communication does not contain undesirable code.

31. A non-transitory computer readable storage medium including computer executable code for computer security, comprising:
  code for intercepting an incoming communication;
  code for placing the communication into a quarantine queue;
  code for selecting a communication from the quarantine queue;
  code for determining whether the selected communication contains undesirable code;
  code for, in response to determining that the selected communication does not contain undesirable code, determining whether a quarantine time for the selected email has lapsed; and
  code for, in response to determining that that quarantine time has not elapsed, placing the selected communication back in the quarantine queue.

32. The computer readable storage medium of claim 31, wherein the incoming communication is an incoming email and the selected communication is a selected email.

33. The computer readable storage medium of claim 31, wherein the incoming communication is an incoming instant message and the selected communication is a selected instant message.

34. The computer readable storage medium of claim 31, wherein the incoming communication is an incoming mobile phone text message and the selected communication is a selected mobile phone text message.

35. The computer readable storage medium of claim 31, wherein the undesirable code is a computer virus.

36. The computer readable storage medium of claim 31, wherein the undesirable code is a Trojan horse.

37. The computer readable storage medium of claim 31, wherein the undesirable code is a worm.

38. The computer readable storage medium of claim 31, wherein the undesirable code is SPAM.

39. The computer readable storage medium of claim 31, wherein signatures for determining whether communications contain undesirable code are updated prior to determining whether the selected communication contains undesirable code.

40. The computer readable storage medium of claim 31, wherein the incoming communication can contain an attachment, and the code for determining whether the selected communication contains undesirable code comprises code for determining whether at least one of a body of the communication and the attachment contain undesirable code.

41. The computer readable storage medium of claim 31, wherein the code for determining whether the selected communication contains undesirable code comprises code for comparing the selected communication to a list of signatures, and wherein the selected communication contains undesirable if it matches a signature in the list of signatures.

42. The computer readable storage medium of claim 40, further comprising code for blocking the selected communication that contains undesirable code from reaching an intended recipient and notifying the intended recipient that the selected communication contains undesirable code.

43. The computer readable storage medium of claim 31, further comprising code for adjusting a local alert level and notifying an antivirus server if the selected communication contains undesirable code.

44. The computer readable storage medium of claim 31, wherein the quarantine time is determined by at least one of a local alert level and by comparing the selected communication to one or more user lists, the user lists comprising sender addresses each associated with a quarantine time.

45. The computer readable storage medium of claim 31, wherein the selected communication is delivered to a user's mailbox if it is determined that the quarantine time has elapsed and the selected email does not contain a virus.

* * * * *